Feb. 24, 1959 E. S. CANNON ET AL 2,874,848
PRESSURE LEAF FILTER WITH PNEUMATIC VIBRATOR FOR RESIDUE REMOVAL
Filed April 5, 1955 2 Sheets-Sheet 1

INVENTORS
EDWARD S. CANNON
BY DON B. LASH
ATTORNEYS

INVENTORS
EDWARD S. CANNON
BY DON B. LASH

ATTORNEYS

United States Patent Office 2,874,848
Patented Feb. 24, 1959

2,874,848

PRESSURE LEAF FILTER WITH PNEUMATIC VIBRATOR FOR RESIDUE REMOVAL

Edward S. Cannon, Lake Worth, Fla., and Don B. Lash, Willoughby Hills, Ohio, assignors to The Berkshire Manufacturing Company, Cleveland, Ohio, a corporation of Ohio Application April 5, 1955, Serial No. 499,420

1 Claim. (Cl. 210—332)

This invention relates to improvements in pressure leaf filters, particularly filters that are adapted to handle chemicals that must be heated to a relatively high temperature, in order to make them sufficiently fluid to be subject to filtration. The chemical material may be corrosive. Molten sulphur is one such material.

In accordance with previous practice when handling materials of the character stated, it has been necessary at frequent intervals to stop the operation of the filter, drain off the material to be filtered, let the apparatus cool down, then remove the top or lid, and knock off the filter cake with a rubber mallet or the like one leaf at a time after which the top may be again secured to the casing and the filtering operation resumed.

The method of the present invention does away with the necessity of the expensive procedure outlined. The casing is not taken apart, the top remains in place with its rather expensive gasket seal and there is no cooling down period prior to the cleaning operation. The apparatus employs a mechanical vibrator preferably operated by compressed air, which may be assembled in the filter and may remain there throughout the regular operation of the filter. It is constructed to impart vibration to all of the filter leaves simultaneously, thereby dislodging the filter cake and enabling the operation to be resumed promptly. Since the filtering operation depends upon pressure, obviously the casing must be filled with liquid to be filtered in order that the contents may be subjected to the desired pressure. The vibrator if mounted internally then must be submerged.

One of the objects of the invention is the provision of a novel method of conditioning a chemical filter handling material under pressure, and especially hot material.

Another object is the provision of apparatus for dislodging filter cake from a pressure leaf filter without disassembling the filter.

Other objects and features of novelty will appear as we proceed with the description of that embodiment of the invention which, for the purposes of the present application, we have illustrated in the accompanying drawings, in which Fig. 1 is a perspective view of a partially assembled filter, only two of the filter leaves being in operative position;

Figure 1:
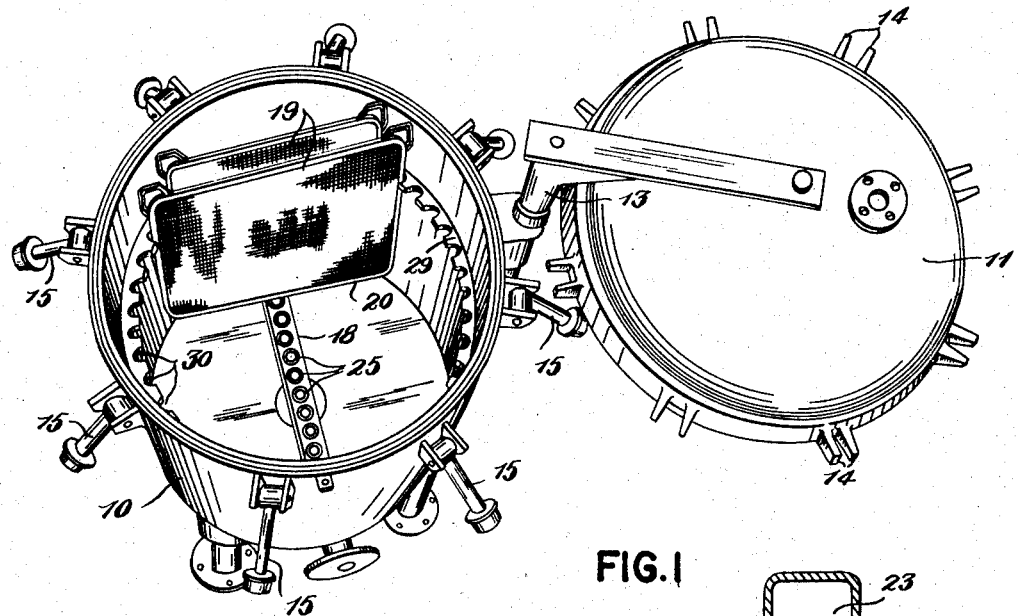

In the drawing the casing of a filter is shown at 10. It is provided with a top or lid 11, the two parts being sealed by a gasket 12. Means may be provided as indicated at 13 in Fig. 1 for raising the lid slightly and swinging it around out of the way. To fasten the lid tightly in place it may be provided at intervals with pairs of fingers 14 between which fit clamping screws 15 pivotally mounted on the casing.

Figure 4:
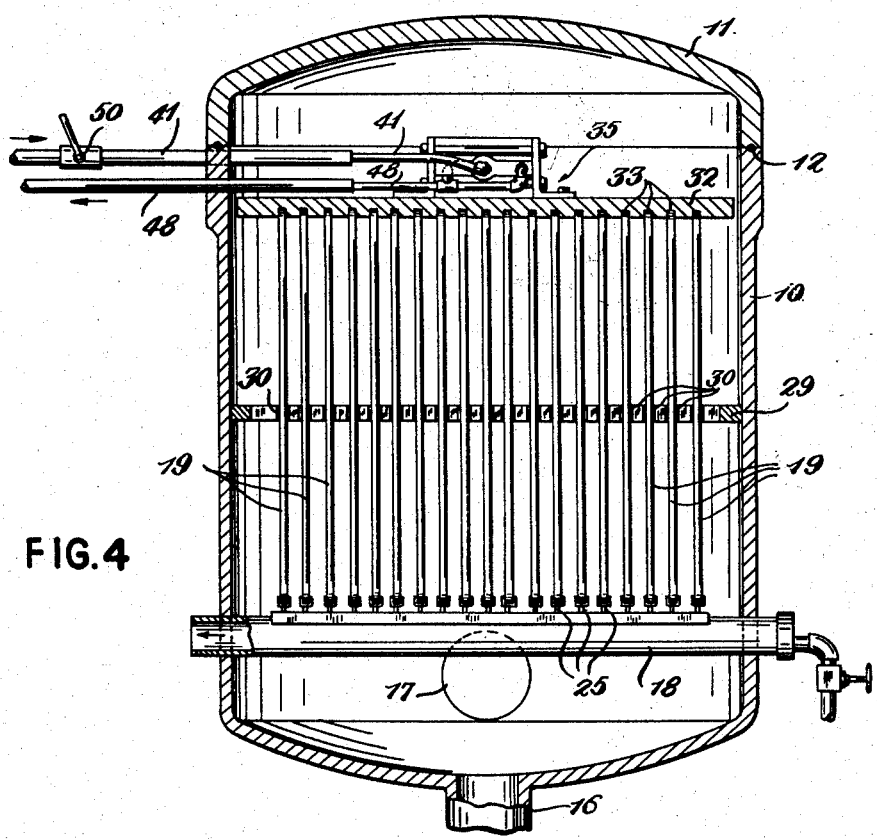
Fig. 4 is a vertical sectional view with the cover in place.

The lower end of the casing is hopper shaped and terminates in a central pipe 16 through which fluid to be filtered may be pumped into the casing under pressure, and through which by proper manipulation of valves, not shown, the fluid in the casing may be drained out when necessary. 17, Fig. 4, indicates a door which may be opened on occasion and through which filter cake shaken loose from the filter leaves may be raked out.

A manifold delivery pipe 18 extends through the casing somewhat above the lower end thereof. The clear filtrate is delivered from each of the filter leaves into this manifold and flows out one end thereof as indicated by the arrow in Fig. 4.

A series of upright filter leaves 19 are disposed in parallel relation within the casing. Each leaf comprises a continuous tubular frame member 20 having top, bottom and sides. The leaf also comprises two screens 21 of fine wire screening disposed upon opposite sides of a coarse wire screen 22 which serves to space the screens 21 apart and provides a chamber between screens 21 communicating with the perimetrical conductor 23 in the frame. The manifold 18 is provided on its upper side with a series of evenly spaced bores 25 which are adapted to receive nozzles 26 on the lower sides of the frames 20 and provided with passages 27 connecting each frame with the manifold. Rubber O-rings 28 serve to seal each nozzle into the manifold, but permit the frame to be pulled upwardly if occasion arises for disconnecting it from the manifold.

Figure 2:
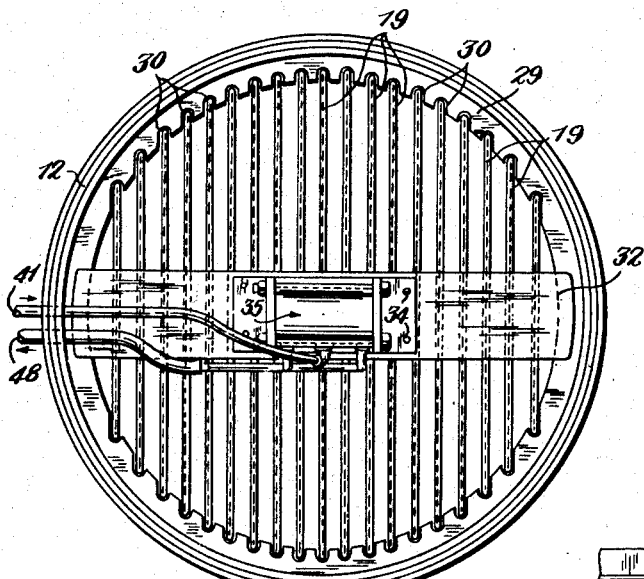
Fig. 2 is a plan view of the filter with the top or lid removed.
Figure 3:
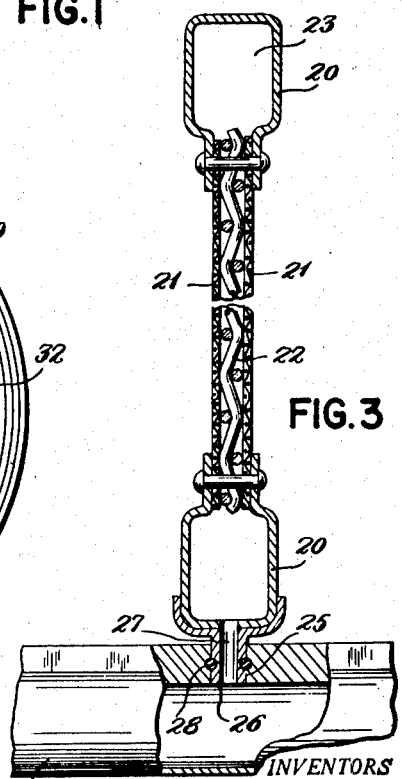
Fig. 3 is a transverse sectional view on a larger scale of a filter leaf the nozzle of which is shown mounted in the clear filtrate delivery manifold of the filter.

At a height intermediate the top and bottom of the casing a metal ring 29 is secured to the internal wall. It is formed with guide slots 30 which, as clearly appears from Fig. 2, are all parallel and are of a width to permit slight movement of the leaves transversely to their principal planes.

The means for shaking the filter leaves to dislodge filter cake comprises a bar 32 which may be of the order of eight inches in width and one inch in thickness. It is of a length somewhat less than the interior diameter of the casing. On its under surface it is formed with a series of grooves 33 of dimensions to receive the frame 20 at the top of each filter leaf. On the upper surface of bar 32 a vibrator 35 may be mounted by means of bolts 34 or the like, the vibrator comprising a cylinder 36 and end walls 37. Within the cylinder there is a double ended piston 38 urged normally in one direction by a coil spring 39 so as to prevent the piston from stopping on dead center.

In all installations the cylinder has a central annular groove 40 with which the pressure air line 41 communicates. Radial passages 42 and 43 are each adapted to register with the groove 40 when the piston is in the proper position, and lengthwise passages 44 and 45 extend from passages 42 and 43 to opposite ends of the piston. Exhaust ports 46 and 47 communicate with an exhaust line 48. When the vibrator is mounted within the casing, the two lines 41 and 48 have flexible portions within the casing to accommodate the vibration, and extend through sealed openings in the casing, as indicated in Fig. 4.

Figure 5:
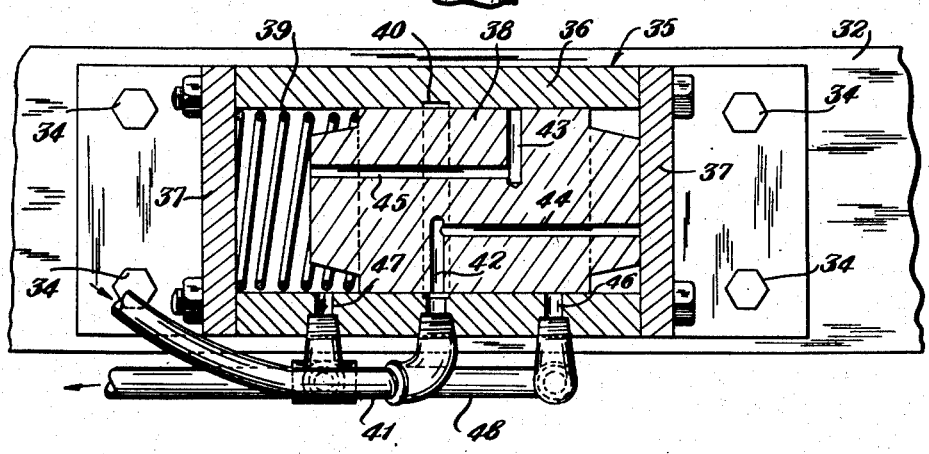
Fig. 5 is a detail plan view on a larger scale showing the vibrator in horizontal section.

In Fig. 5 piston 38 is shown at the conclusion of its travel toward the right. The piston, which possesses a substantial amount of mass, has just struck the cylinder end wall 37 and imparted to it a blow which is passed on to the bar 32 and thence to the upper edges of all of the filter leaves. Now air pressure is delivered through passages 42 and 44 to the cylinder chamber at the right end of the vibrator and the piston is moved rapidly toward the left, the movement continuing until the piston strikes the cylinder end wall 37 and imparts a like blow that is transmitted to the bar 32 and the upper edges of the filter leaves. By the time the piston in its leftward travel uncovers the exhaust port 46, the piston will have sufficient inertia to cause it to complete its leftward travel. The exhaust port 47 remains open through the greater part of this travel. By the time the blow has been delivered upon the end wall 37 of the cylinder, passage 43 will register with annular groove 40 and air pressure will then be delivered through passages 43 and 45 to drive the piston toward the right. These alternating left and right blows are delivered in rapid succession as long as the valve, represented at 50, in pressure air line 41 remains open.

Any filter cake on the filter leaves is thereby rapidly shaken off and falls down into the hopper portion of the casing. The vibration is effective over each filter leaf in its entirety, the pivot point for the movement being the nozzle 25 in each case. The slots 30 in ring 29 do not prevent movement although they may in some cases function as supplemental fulcrum points tending to bow the filter leaves first in one direction and then in the other, thereby assisting in the breakage and dislodgement of the filter cake.

In some cases the shaking off of the filter cake is effected best without draining off the liquid material in the casing and while maintaining a relatively high level of liquid. Time can be saved in this way, but the procedure is beneficial also because the whole content of the casing including the liquid, is subjected to vibration, and the resulting movement of the liquid tends to flush off the filter cake.

In practice it is advisable to use the vibrator once or more every twenty-four hours, and when this is done the filter may be used for long periods without its being taken apart and cleaned as has been necessary at practically daily intervals heretofore. Furthermore, the filter cake removal with our invention requires only a few minutes of interruption of the filtering procedure, whereas previously the removal of the filter cake required cooling the apparatus, removing the top or lid, striking the upper frame element 20 of each filter leaf with a rubber mallet or the like to dislodge filter cake from the leaves one at a time, placing a new gasket upon the upper edge of the casing, replacing the top and bolting it down. The saving by the use of the new method is therefore highly important.

While the invention is illustrated and described as applied to a vertical type of filter, it is applicable also to what is termed a horizontal filter in which, however, the individual leaves are disposed in vertical planes. Also the disposition of the bar 32 carrying the vibrator is preferably at the top as illustrated. However, it will be appreciated that a bar similar to bar 32 may be employed upon one or both sides of the filter leaves, particularly in a horizontal type filter.

Having thus described our invention, we claim:

In a pressure leaf filler, a fluid-tight casing, plurality of vertically disposed parallel filter leaves mounted therein, each leaf comprising a tubular channel frame surrounding a pair of spaced screens secured to the frame and providing a clear filtrate chamber between the screens, a delivery manifold in said casing, the bottom of each frame being connected with said manifold by a nozzle, means for introducing into said casing under pressure the material to be filtered, a bar extending transversely across the tops of said leaves, said bar having means for engaging each filter leaf, a pneumatic vibrator secured to said bar, control means for said vibrator operable externally of said casing and comprising conductors extending through sealed openings in the casing, a filter means on opposed inner walls of the casing intermediate the top and bottom thereof in which the side elements of the filter frames are loosely supported, whereby each leaf has a single point bottom mounting and two non-positive side mountings permitting shaking movement of the leaf for dislodging filter cake in response to the operation of said vibrator.

References Cited in the file of this patent

UNITED STATES PATENTS

| | | |
|---|---|---|
| 1,867,397 | Brace et al. | July 12, 1932 |
| 2,365,360 | Smith | Dec. 19, 1944 |
| 2,460,416 | Goodrich | Feb. 1, 1949 |
| 2,480,320 | Carrier | Aug. 30, 1949 |
| 2,743,090 | Malan | Apr. 24, 1956 |
| 2,778,612 | Peterson | Jan. 22, 1957 |